United States Patent
Milne et al.

(10) Patent No.: US 10,965,159 B2
(45) Date of Patent: Mar. 30, 2021

(54) SCALABLE ANTENNA SYSTEM

(71) Applicants: Sony Corporation, Tokyo (JP); Sony Network Entertainment International LLC, Los Angeles, CA (US)

(72) Inventors: James R. Milne, Ramona, CA (US); Charles McCoy, Coronado, CA (US); True Xiong, San Diego, CA (US)

(73) Assignees: Sony Corporation, Tokyo (JP); Sony Network Entertainment International LLC, LosAngeles, CA (US)

( * ) Notice: Subject to any disclaimer, the term of this patent is extended or adjusted under 35 U.S.C. 154(b) by 840 days.

(21) Appl. No.: 14/290,426

(22) Filed: May 29, 2014

(65) Prior Publication Data

US 2015/0349537 A1 Dec. 3, 2015

(51) Int. Cl.
*H02J 50/12* (2016.01)
*H02J 7/02* (2016.01)
(Continued)

(52) U.S. Cl.
CPC .......... *H02J 50/12* (2016.02); *H01Q 1/2216* (2013.01); *H01Q 7/00* (2013.01); *H02J 7/025* (2013.01);
(Continued)

(58) Field of Classification Search
CPC .. H02J 5/005; H02J 50/10; H02J 50/12; H02J 50/80; H02J 50/90; H02J 50/40; H02J 50/70; H01Q 1/2216; H01Q 7/00
(Continued)

(56) References Cited

U.S. PATENT DOCUMENTS

| 3,985,357 A | 10/1976 | Miller |
| 4,123,511 A | 10/1978 | Heintze |

(Continued)

FOREIGN PATENT DOCUMENTS

| CN | 101783931 | 7/2010 |
| WO | 2009130199 | 10/2009 |
| WO | 2013105920 | 7/2013 |

OTHER PUBLICATIONS

Azimi, R., et al., "Vehicular Networks for Collision Avoidance at Intersections", Society for Automotive Engineers (SAE) World Congress, Apr. 2014.
(Continued)

*Primary Examiner* — Rexford N Barnie
*Assistant Examiner* — Swarna N Chowdhuri
(74) *Attorney, Agent, or Firm* — Fitch, Even, Tabin & Flannery LLP (57) ABSTRACT

Some embodiments providing antenna systems comprising: a frame; a power transfer antenna cooperated with the frame, wherein the power transfer antenna is configured to enable at least one of wirelessly and inductively receiving electrical power from another consumer electronic device and wirelessly and inductively transmitting electrical power to another consumer electronic device; one or more low power communications antennas cooperated with the frame and configured to wirelessly transmit and receive communications with one or more other remote consumer electronic devices; wherein the frame is configured to readily be positioned within and mounted with multiple different consumer electronic devices and provide the consumer electronic device within which it is mounted with wireless power transfer capabilities and communication capabilities with a separate consumer electronic device with which wireless power transfer is to occur.

19 Claims, 6 Drawing Sheets

(51) Int. Cl.
- *H02J 50/90* (2016.01)
- *H02J 50/70* (2016.01)
- *H02J 50/80* (2016.01)
- *H02J 50/40* (2016.01)
- *H01Q 7/00* (2006.01)
- *H02J 50/10* (2016.01)
- *H01Q 1/22* (2006.01)

(52) U.S. Cl.
CPC .............. *H02J 50/10* (2016.02); *H02J 50/40* (2016.02); *H02J 50/70* (2016.02); *H02J 50/80* (2016.02); *H02J 50/90* (2016.02)

(58) Field of Classification Search
USPC ........................................................ 307/104
See application file for complete search history.

(56) References Cited

U.S. PATENT DOCUMENTS

| | | |
|---|---|---|
| 4,301,207 A | 11/1981 | Schomerus |
| 4,340,053 A | 7/1982 | Sarui |
| 4,463,949 A | 8/1984 | McCoy, Sr. |
| 4,625,336 A | 12/1986 | Derderian |
| 4,962,935 A | 10/1990 | Williams |
| 4,992,003 A | 2/1991 | Perach |
| 5,154,266 A | 10/1992 | Bieber |
| 5,201,075 A | 4/1993 | Svetich |
| 5,219,316 A | 6/1993 | Huffman |
| 5,413,328 A | 5/1995 | Glancey |
| 5,639,243 A | 6/1997 | Ryan |
| 5,755,405 A | 5/1998 | Socha |
| 5,927,233 A | 7/1999 | Mainini |
| 6,401,250 B1 | 6/2002 | McNabb |
| 6,438,755 B1 | 8/2002 | MacDonald |
| 6,588,840 B1 | 7/2003 | Lombardo |
| 6,742,636 B2 | 6/2004 | Godshaw |
| 6,810,831 B1 | 11/2004 | Opfel |
| 6,910,447 B1 | 6/2005 | Azarian |
| 6,946,817 B2 | 9/2005 | Fischer et al. |
| 7,323,981 B2 | 1/2008 | Peel |
| 7,328,671 B2 | 2/2008 | Kates |
| 7,416,123 B2 | 8/2008 | Saperstein |
| 7,438,356 B2 | 10/2008 | Howman |
| 7,451,927 B2 | 11/2008 | Saperstein |
| 7,626,966 B1 | 12/2009 | Ruiter |
| 7,714,708 B2 | 5/2010 | Brackmann |
| 7,753,826 B1 | 7/2010 | Oliver |
| 7,768,150 B2 | 8/2010 | Platania et al. |
| 7,770,539 B1 | 8/2010 | Zimmerman |
| 7,818,820 B2 | 10/2010 | Tsujimoto |
| 7,916,025 B2 | 3/2011 | Locker |
| 7,962,186 B2 | 6/2011 | Cui et al. |
| 8,149,748 B2 | 4/2012 | Bata |
| 8,233,846 B2 | 7/2012 | Rofougaran |
| 8,253,557 B2 | 8/2012 | Ani |
| 8,366,570 B1 | 2/2013 | DeMarco |
| 8,526,970 B2 | 9/2013 | Wala et al. |
| 8,568,191 B2 | 10/2013 | Rehkemper |
| 8,583,182 B2 | 11/2013 | Piirainen et al. |
| 8,609,454 B2 | 12/2013 | Dai |
| 8,624,743 B2 | 1/2014 | Langer |
| 8,719,001 B1 | 5/2014 | Izdepski et al. |
| 8,878,671 B2 | 11/2014 | Buchheim |
| 9,252,628 B2 * | 2/2016 | Leabman ................ H02J 7/025 |
| 9,361,802 B2 | 6/2016 | Milne |
| 9,426,610 B2 | 8/2016 | Milne |
| 9,577,463 B2 | 2/2017 | McCoy |
| 9,654,179 B2 * | 5/2017 | Shultz .................. H04W 12/04 |
| 9,793,758 B2 * | 10/2017 | Leabman ................ H02J 50/20 |
| 9,843,360 B2 | 12/2017 | McCoy |
| 9,893,424 B2 * | 2/2018 | Han ........................ H02J 50/10 |
| 9,906,897 B2 | 2/2018 | Milne |
| 9,941,741 B2 * | 4/2018 | Jantunen .............. H04B 5/0037 |
| 10,277,280 B2 | 4/2019 | Milne |
| 2004/0125493 A1 | 7/2004 | Shimotono |
| 2004/0141635 A1 | 7/2004 | Liang |
| 2004/0167367 A1 | 8/2004 | Beierle |
| 2005/0034083 A1 | 2/2005 | Jaeger |
| 2005/0127868 A1 | 6/2005 | Calhoon |
| 2005/0259033 A1 | 11/2005 | Levine |
| 2005/0284405 A1 | 12/2005 | Pomakoy-Poole |
| 2006/0063540 A1 | 3/2006 | Beuck |
| 2006/0080072 A1 | 4/2006 | Lachman |
| 2006/0154642 A1 | 7/2006 | Scannell |
| 2006/0242901 A1 | 11/2006 | Casimaty |
| 2007/0069687 A1 | 3/2007 | Suzuki |
| 2007/0130893 A1 | 6/2007 | Davies |
| 2007/0138272 A1 | 6/2007 | Saperstein |
| 2007/0138273 A1 | 6/2007 | Saperstein |
| 2007/0152479 A1 | 7/2007 | Howman |
| 2007/0243296 A1 | 10/2007 | Bourassa |
| 2008/0036610 A1 | 2/2008 | Hokuf |
| 2008/0120768 A1 | 5/2008 | Tsujimoto |
| 2008/0173257 A1 | 7/2008 | Steiner |
| 2008/0229704 A1 | 9/2008 | Augustyniak |
| 2009/0118869 A1 | 5/2009 | Cauchy |
| 2009/0203367 A1 | 8/2009 | Pamminger |
| 2010/0119755 A1 | 5/2010 | Chung |
| 2010/0123778 A1 | 5/2010 | Hada |
| 2010/0152545 A1 | 6/2010 | Ramsay |
| 2010/0295687 A1 | 11/2010 | Kuzniar |
| 2011/0005466 A1 | 1/2011 | Furth |
| 2011/0031928 A1 * | 2/2011 | Soar .................... H04B 5/0031 320/108 |
| 2011/0105099 A1 | 5/2011 | Roll |
| 2011/0156640 A1 | 6/2011 | Moshfeghi |
| 2012/0069051 A1 | 3/2012 | Hagbi |
| 2012/0099800 A1 | 4/2012 | Llano |
| 2012/0184200 A1 | 7/2012 | Chutorash et al. |
| 2012/0303939 A1 | 11/2012 | Cain et al. |
| 2012/0319487 A1 | 12/2012 | Shah |
| 2013/0015705 A1 * | 1/2013 | Abe ....................... H02J 50/10 307/29 |
| 2013/0056929 A1 | 3/2013 | Rehkemper |
| 2013/0068942 A1 | 3/2013 | Verenchikov |
| 2013/0093220 A1 | 4/2013 | Pajic |
| 2013/0134923 A1 | 5/2013 | Smith |
| 2013/0141251 A1 | 6/2013 | Sims |
| 2013/0292976 A1 | 11/2013 | Kane |
| 2014/0023060 A1 | 1/2014 | Apte et al. |
| 2014/0025805 A1 | 1/2014 | Apte |
| 2014/0104046 A1 | 4/2014 | Howell |
| 2014/0117921 A1 | 5/2014 | Suomela |
| 2014/0118635 A1 | 5/2014 | Yang |
| 2014/0148095 A1 | 5/2014 | Smith et al. |
| 2014/0179463 A1 | 6/2014 | Giles |
| 2014/0285033 A1 * | 9/2014 | Jantunen .............. H04B 5/0062 307/149 |
| 2015/0194814 A1 * | 7/2015 | Taylor .................. H04B 5/0037 307/31 |
| 2015/0340911 A1 | 11/2015 | Bell |
| 2015/0348413 A1 | 12/2015 | Han |
| 2015/0349572 A1 | 12/2015 | McCoy |
| 2016/0019515 A1 | 1/2016 | Milne |
| 2016/0019788 A1 | 1/2016 | Milne |
| 2016/0021492 A1 | 1/2016 | Carlsson |
| 2016/0021493 A1 | 1/2016 | Milne |
| 2016/0021510 A1 | 1/2016 | Milne |
| 2016/0049993 A1 | 2/2016 | McCoy |
| 2016/0233727 A1 * | 8/2016 | Ollikainen ........... H04B 5/0031 |
| 2017/0063431 A1 | 3/2017 | Milne |

OTHER PUBLICATIONS

Dahiya, A., et al., "A Comparative Study of MANET and VANET Environment", Journal of Computing, www.sites.google.com/site/JournalofComputing/, Jul. 2010, vol. 2, Issue 7, 2151-9617.

Eichler, S., et al., "Simulation of Car-to-Car Messaging: Analyzing the Impact on the Road Traffic", IEEE Computer Society, (2005).

Gonzalvez, J., et al., "IEEE 802.11p Vehicle to Infrastructure Communications in Urban Environments", IEEE Communications Magazine, vol. 50, No. 5, pp. 176-183, May 2012.

(56) References Cited

OTHER PUBLICATIONS

Kosch, T., et al., "The Scalability problem of Vehicular ad hoc networks and how to solve it", www.alexandria.unisg.ch/Publikationen/30977, IEEE Wireless Communications Magazine, No. 5, S.6., (Oct. 2006).

Rawat, D., "Enhancing VANET Performance by joint Adaptation of Transmission Power and Contention Window Size", IEEE Transaction on Parallel and Distributed Systems, vol. 22, No. 9, pp. 1528-1535, Sep. 2011.

Saeed, Y., et al., "Obstacle Management in VANET using Game Theory and Fuzzy Logic Control", ACEEE Int. J. on Communications, vol. 4, No. 1, Jul. 2013.

The seventh ACM International Workshop on Vehicular Inter-Networking (VANET 2010) in conjunction with ACM MobiCom 2010. Sep. 24, 2010.

U.S. Appl. No. 14/332,919; Office Action dated Jan. 20, 2016.
U.S. Appl. No. 14/333,006; Office Action dated Aug. 27, 2015.
U.S. Appl. No. 14/332,900; Office Action dated Jan. 14, 2016.
U.S. Appl. No. 14/332,900; Response to Office Action filed Jan. 15, 2016.
U.S. Appl. No. 14/333,006; Final Office Action dated Oct. 28, 2015.
U.S. Appl. No. 14/333,006; Office Action dated Dec. 4, 2015.
U.S. Appl. No. 14/333,006; Response to Final Office Action filed Oct. 28, 2015.
U.S. Appl. No. 14/333,006; Response to Office Action filed Dec. 10, 2015.
U.S. Appl. No. 14/333,006; Response to Office Action filed Aug. 31, 2015.
Zhang, T., et al., VNTA sub-TC, www.danielwireless.com/vnta/, IEEE Communications Society, Jun. 2014.
Taiwan Interantional Patent Office; Taiwan Patent App. No. 104121483; International Search Report dated Apr. 22, 2016.
Taiwan International Patent Office; Taiwan Patent App. No. 104121483; Taiwan Office Action dated Apr. 22, 2016.
U.S. Appl. No. 14/290,409; Notice of Allowance dated Oct. 7, 2017.
U.S. Appl. No. 14/290,409; Office Action dated Apr. 19, 2016.
U.S. Appl. No. 14/460,224; Notice of Allowance dated Aug. 9, 2017.
U.S. Appl. No. 14/460,224; Office Action dated Apr. 19, 2017.
U.S. Appl. No. 15/347,717; Notice of Allowance dated Dec. 20, 2018.
U.S. Appl. No. 15/347,717; Office Action dated Jul. 24, 2018.
Eveready Industries India Ltd.; Mobile Power Pack (2200aAH); http://www.ultimamobilepower.com/products/pdfs/um-22.pdf; Dec. 3, 2012; p. 1.
Eveready Industries India Ltd.; Eveready Ultima Mobile Power Pack UM22; http://www.ultimamobilepower.com/products/UM-22.aspx; Dec. 3, 2012; p. 1.
Computerworld Inc.; "Intel wants your next PC to have no wires"; http://www.computerworld.com/s/article/9248824/Intel_wants_your_next_PC_to_have_no_wires; Jun. 4, 2014; p. 1-4.
U.S. Appl. No. 14/290,409, filed May 29, 2014; pp. 36.
U.S. Appl. No. 14/460,224, filed Aug. 14, 2014; pp. 43.

* cited by examiner

SCALABLE ANTENNA SYSTEM

RELATED APPLICATION

This application is related to co-pending U.S. application Ser. No. 14/290,409, filed on the same date and entitled PORTABLE DEVICE TO PORTABLE DEVICE WIRELESS POWER TRANSFER METHODS AND SYSTEMS, issued as U.S. Pat. No. 9,577,463, which is incorporated in its entirety herein by reference.

BACKGROUND

1. Field of the Invention

The present invention relates generally to consumer electronic devices, and more specifically to powering and data communication of consumer electronic devices.

2. Discussion of the Related Art

The number and types of consumer electronic devices continues to increase. Further, the number of electronic devices individual users use and/or regularly access continues to increase.

Many households, offices and the like include numerous consumer electronic devices. At least some of the devices are configured to communicate with one or more other devices.

SUMMARY OF THE INVENTION

The present embodiments advantageously address the needs above as well as other needs by, in part, providing antenna systems configured to operate within a consumer electronic device, and comprising: a frame; a power transfer antenna cooperated with the frame, wherein the power transfer antenna is configured to enable at least one of wirelessly and inductively receive electrical power from another consumer electronic device and to wirelessly and inductively transmit electrical power to another consumer electronic device; one or more low power communications antennas cooperated with the frame, wherein the one or more communications antenna are configured to wirelessly transmit and receive communications with one or more other remote devices over distances consistent with those to achieve wireless and inductive electrical power transfer through the power transfer antenna; wherein the frame is configured to readily be positioned within and mounted with multiple different consumer electronic devices and provide the consumer electronic device within which it is mounted with wireless power transfer capabilities and communication capabilities with a separate consumer electronic device with which wireless power transfer is to occur.

Further, some embodiments provide methods, comprising: detecting, through a power transfer antenna in an antenna system secured with a consumer electronic (CE) device, an inductive coupling with a separate power transfer antenna cooperated with a separate CE device, wherein the power transfer antenna is configured to wirelessly and inductively receive electrical power from another consumer electronic device and to wirelessly and inductively transmit electrical power to another consumer electronic device, and wherein the power transfer antenna is cooperated with a frame; establishing one or more low power communication couplings between one or more local low power communications antennas, which are cooperated with the frame, and one or more remote other communication antennas of the separate CE device, wherein the one or more communications antenna are configured to wirelessly transmit and receive communications with the one or more other communication antennas over distances consistent with those to achieve wireless and inductive electrical power transfer through the power transfer antenna; wherein the frame is configured to readily be positioned within and mounted with multiple different CE devices and provide the CD device within which it is mounted with wireless power transfer capabilities and communication capabilities.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

It can be beneficial in many instances to allow consumer electronic devices wirelessly transmit and/or share power between two or more consumer electronic devices. For example, some embodiments allow one cell phone to obtain power from and/or use battery power from another cell phone. It is a common situation where two people have smart phones with very different levels of battery charge remaining. For example, multiple portable devices (e.g., smart phones) are in a location with one or more of them having a significantly low battery charge where the person (s) with the low battery level would like to or needs to do things with their device. This may be due to the fact that they are the type of person that is always interfacing with their phone, or this may be due to the fact that there are a lot of remote people communicating with that person, possibly due to a big recent event where communication is important. Since these remote people communicating with the person having the phone number of the smart phone with the low power set up in their contacts, it is often not convenient for that person to just use another person's phone that has more battery power. Similarly, a person's mobile device may be low on battery power because it has not been charged recently, while another person's device may have a nearly full battery because it has recently been charged.

Figure 1A:
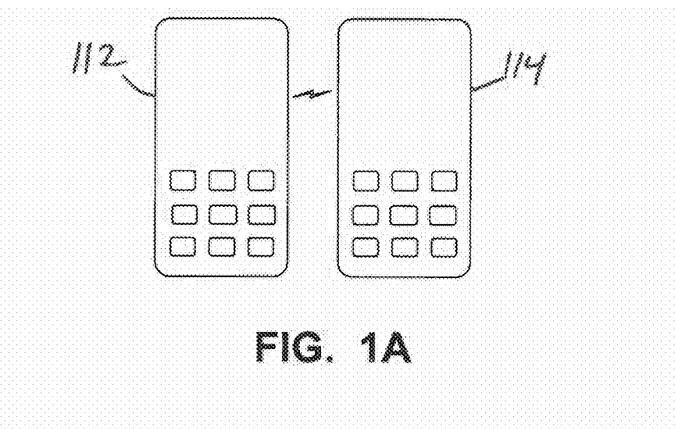
FIG. 1A shows a simplified block diagram of two portable consumer electronic (CE) devices positions proximate each other, in accordance with some embodiments.
Figure 1B:
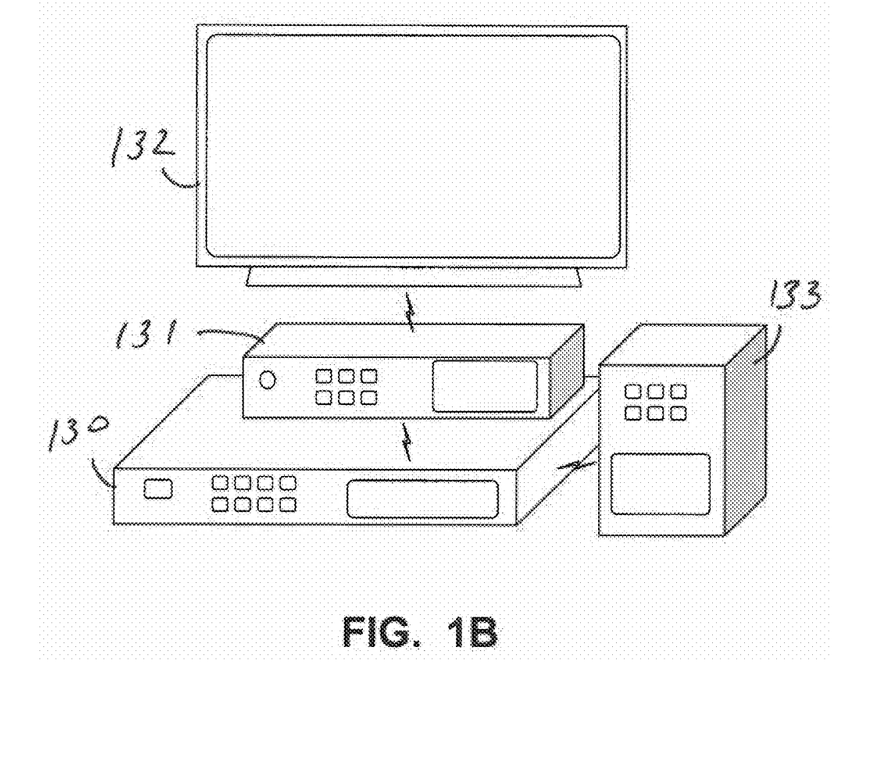
FIG. 1B illustrates multiple CE devices positioned proximate each other, in accordance with some embodiments.

FIG. 1A shows a simplified block diagram of two portable consumer electronic (CE) devices 112, 114 positions proximate each other, in accordance with some embodiments. FIG. 1B illustrates multiple CE devices 130-133 positioned proximate each other, in accordance with some embodiments. The CE devices each include an antenna system, module and/or circuitry that is configured to provide wireless power transfer as well as wireless communications between two or more CE devices. Accordingly, the CE devices utilize the antenna system to cooperatively couple with one or more other CE devices to enable wirelessly transferring power between at least a first CE device (e.g., CE device 112) a second CE (e.g., CE device 114), and to wirelessly communicate between the first and second CE devices. As such, electrical power can be transferred, for example, from the first CE device 112 to the second CE device 114, which may allow the second CE device 114 to continue to operate and/or to at least partially store electrical power to be used by the second CE device. The CE devices can be substantially any relevant CE device that is configured with an antenna system. For example, the CE devices can be a smart phone, tablet, laptop, television, set-top-box, game controller, amplifier, cell phone, portable gaming device (e.g., a PlayStation Portable, etc.), multimedia player (e.g., DVD/Blu-ray player, iPod, MP3 player, etc.), car stereo, vehicle entertainment system (e.g., car, airplane, train, etc.), car charging device, and other such CE devices. Further, the CE devices do not have to be the same type of devices.

Referring to FIG. 1B, further, in some implementations, a CE device, such as a fourth CE device 131 may include two or more antenna systems that allow it to wirelessly and inductively couple with two or more different CE devices. As such, in accordance with some embodiments, wireless power transfer may be daisy chained from the third CE device 130, through the fourth CE device 131, to the fifth CE device 132. Similarly, in some implementations, the one or more antenna systems may allow the fourth CE device to wirelessly daisy chain communications between the third CE device 130 and the fifth CE device 132. Further, the fourth CE device 131 can independently communicate with the third and/or fifth CE devices, and/or implement a wireless power transfer to or from one or both of the third and fifth CE devices. Power transfer and/or communications may be unidirectional or bidirectional depending on an intended operation.

In some implementations, an antenna system allows one or more of the CE devices 130-133 to operate without any externally accessible communications ports and/or power cords. Instead, for example, the fourth CE device 131 may receive all operation power from one or both the third CE device 130 and/or the fifth CE device 132. Similarly, the antenna system allows the fourth CE device to externally communicate with one or more other CE devices without the need for cable or fiber optic communications. For example, the fourth CE device 131 may be a Blu-ray player communicationally coupled with the television 132 to wirelessly communicate the multimedia content from a Blu-ray disc to the television for playback without the need for cable connections or external ports. Similarly, the fourth CE device 131 may receive power to operate from the third and/or fifth CE devices. As such, in some implementations, the CE device can be designed and assembled without any external ports or connectors, and one or more antenna systems can be incorporated that allows the CE device to acquire power and communicate with one or more other CE devices. In some embodiments, CE devices and/or one or more communications antennas of one or more antenna systems in a CE device can operate without externally accessible communication ports, and in some instances all communications with the consumer electronic device in which the antenna system is mounted are through the one or more communications antennas of one or more antenna systems.

Figure 2:
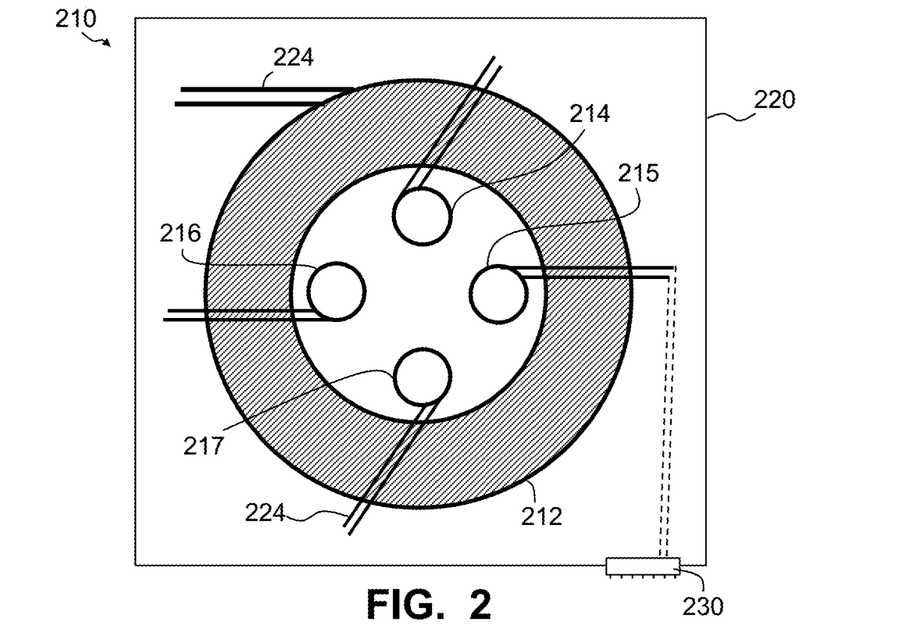
FIG. 2 depicts a simplified plane view of an antenna system, in accordance with some embodiments.

FIG. 2 depicts a simplified plane view of an antenna system 210, in accordance with some embodiments. The antenna system 210 include an antenna array comprising one or more power transfer antennas 212 and one or more low power communications antennas 214-217. The power transfer antenna 212 is configured to enable at least one of wirelessly and inductively receiving electrical power from another consumer electronic device and to wirelessly and inductively transmitting electrical power to another consumer electronic device. In many applications, the antenna system can be configured to transmit and receive power.

Similarly, the one or more communications antennas 214-217 are configured to wirelessly transmit and receive communications with one or more other remote devices. Further, the communication antennas and corresponding drive circuitry (not illustrated) are, in some implementations, configured to provide low power wireless communications such that the distance of the wireless communication is relatively limited. For example, the low power communication may be limited to less than 10 feet, and in some implementations, may be limited to distances that are consistent with distances between two power transfer antennas to achieve wireless and inductive electrical power transfer between the two power transfer antennas. In some embodiments, the relatively short communication distance allows the wireless communications signals to be transferred using a reduced or scaled down power levels than typically used with other longer range communications while still achieving reliable communication over such distances.

In some embodiments, the antenna system 210 includes a frame 220, base, housing or other such structure. The power transfer antenna 212 and one or more communications antennas 214-217 are positioned and secured with the frame 220, at least in part, to maintain positioning of the power transfer antenna and the one or more communications antennas. In some embodiments, the frame is further designed and/or configured to readily be positioned within and mounted with multiple different consumer electronic devices, and to provide the consumer electronic device within which it is mounted with wireless power transfer capabilities and communication capabilities with a separate consumer electronic device. Accordingly, in some implementations the antenna system 210 provides a modular structure with a defined size and/or shape that can be incorporated into multiple different types of CE devices.

In some embodiments, the antenna system may be configured in accordance with a predefined standard that allows CE devices to be designed to readily receive and incorporate an antenna system 210. Similarly, there may be different configurations of different antenna systems. For example, there may be a plurality of different predefined standards and different antenna systems configured according to the different predefined standards depending, for example, on desired capability and/or features being designed into the CE device. For example, a first standard for an antenna system 210 may include one communications antenna 214 (e.g., for a Wi-Fi wireless communication protocol) and power transfer antenna capabilities, while a second standard an antenna system 210 may include the power transfer antenna and four or more communications antennas to provide the capability to communicate according to multiple different communication protocols (e.g., USB, Ethernet, eSATA, serial, etc.). Further, multiple different standards could also be utilized to accommodate different and/or conflicting design goals of different CE devices. For example, an antenna system or module configured in accordance with a first standard may be intended for use with mobile devices and designed to a minimize size to avoid increasing a size of the mobile device and/or to allow the size of the mobile device to be reduced (e.g., may eliminate the need for external connectors). Another antenna system may be configured according to a second standard, which may be intended for use in home theater components that are typically significantly larger. Because of the larger area, the antenna system may similarly be larger and/or configured to provide a much larger quantity of power to be transferred.

Each of the power transfer antenna 212 and the one or more communications antennas 214-217 include leads 224, pins, wires or other such electrical connectors to allow the power transfer antenna and communications antennas to couple with power, control and/or drive circuitry. The leads 224 may couple with other components within the CE device. In some implementations the antenna system 210 includes one or more connectors 230 and the leads 224 couple with a connector 230 of the antenna system 210. The connector 230 can be configured to cooperate with one or more mating connectors of the CE device. In some embodiments, some or all of communications control and/or drive circuitry may be incorporated onto the frame 220 as part of the antenna system. Similarly, in some embodiments, some or all of a wireless power distribution circuitry and/or systems may be incorporated onto the frame as part of the antenna system. In other embodiments, the drive and/or control circuitry may be partially or fully implemented external to the antenna system.

The communications antennas 214-217 can be utilized to provide wireless communication in one or more communication protocols. For example, a first communications antenna 214 can be utilized to provide wireless communication in accordance with a universal serial bus (USB) communication protocol, a second communications antenna 215 can be utilized to provide communications according to the Ethernet protocol, a third communications antenna 216 can be utilized to provide communications according to serial Advanced Technology Attachment (SATA) or external SATA (eSATA) protocols, and a fourth communications antenna 217 be utilized to provide communications according to Wi-Fi protocol. The communications antennas can be configured and/or utilized for substantially any relevant communications protocol that can be wirelessly transmitted. Further, the different communications antennas may have different shapes, configurations, orientations, made from different materials and the like depending on an intended communications protocol or protocols to be utilized with the communications antenna.

Figure 3:
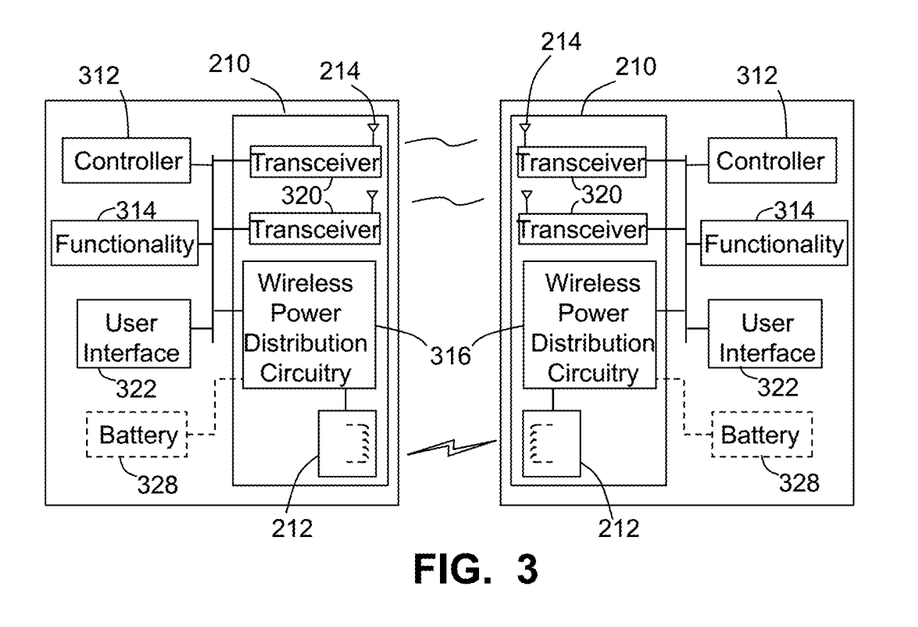
FIG. 3 shows a simplified block diagram of a first CE device positioned proximate to and wirelessly and inductively coupled with a second CE device, in accordance with some embodiments.

FIG. 3 shows a simplified block diagram of a first CE device 112 positioned proximate to and wirelessly and inductively coupled with a second CE device 114, in accordance with some embodiments. Each CE device 112, 114 includes one or more antenna systems 210, one or more controllers 312, and one or more functional circuitry 314 that provide the intended functionality of the CE device. In some embodiments, the CE devices may also include a user interface 322 that allows the user to interact with the device. Further, the CE device typically includes one or more power storage circuitry or systems 328.

The antenna system 210 includes one or more wireless power transfer antennas 212 and one or more communications antennas 214-216. Further, the CE devices 112, 114 typically also include one or more wireless power distribution circuitry 316 and/or one or more transceivers 320 that couple with the communication antennas. In some embodiments, the power distribution circuitry 316 and/or transceivers 320 are partially or fully incorporated into the antenna system 210. As described above, in some embodiments, the antenna system 210 is constructed as a module that is readily inserted into one of multiple different types of CE devices. In many embodiments, the antenna system includes one or more connectors 230 that allow it to easily mate with corresponding connectors of the CE devices to establish electrical connections with one or more components of the CE device (e.g., connection with the controller, connection with one or more buses, direct coupling with the battery, and/or other such connections or combinations of such connections). Further, in some implementations, the antenna system includes a housing with the connectors being externally accessible to the housing.

In some embodiments, the controller 312 coordinates the operation of the CE device. Further, the controller may control the operation of the one or more transceivers 320 in wireless communication to or from the CE device. Some embodiments include multiple communications antennas positioned proximate the power transfer antennas, and the controller selectively directs different communications to different ones of the multiple communications antennas as a function of a communication protocol with which the communications are intended to be wirelessly transmitted. Similarly, the controller may provide control over the power distribution circuitry 316 in implementing the wireless transfer or reception of electrical power.

The transceiver 320 can be configured to provide bidirectional communication through one or more antennas coupled with the transceiver. In some implementations, the transceiver 320 uses the communications antenna 214 to transmit and/or receive communications from one or more separate CE devices. The information and/or data communicated can be substantially any information or data, which can include but is not limited to communications regarding the control of the transfer of power between the first and second portable CE devices. In some embodiments, the transceiver is configured to provide communications according to a specific communications protocol. Further, in some embodiments, different transceivers and/or different physical layers (PHY) can be cooperated within the antenna system to provide communications according to different communications protocols (e.g., Wi-Fi, Ethernet, USB, etc.). Additionally or alternatively, multiple PHY may be incorporated into a large PHY.

Still further, in some implementations one or more of the communication antennas can be utilized with more than one communications protocol allowing the switching of protocols or format. The selected protocol can be based on a negotiation between the two antenna systems and/or controllers of the CE devices. For example, a controller can be configured to direct communications through a first communications antenna utilizing a first communications protocol, and to switch to a second communications protocol to direct different communications through the first communications antenna utilizing the second communications protocol. The determination of whether to switch an antenna to a different communications protocol or use a different communications antenna of the antenna system can depend on one or more factors, such as whether a communications antenna is already configured for a desired communications protocol, an alignment of communications antennas and/or the power transfer antenna, and/or other such factors.

As introduced above, the additional functional circuitry 314 provides the intended functionality of CE device. For example, a smart phone includes functional circuitry to provide wireless cellular communication, and often also includes functional circuitry that provides other wireless communication (e.g., Bluetooth, Wi-Fi, etc.), multimedia playback functionality, web browsing, and other such functionality. Similarly, a tablet includes functional circuitry 314 configured to provide web browsing, multimedia playback, wireless communication, and/or other such functionality. As another example, a multimedia player (e.g., DVD player, Blu-ray player, tablet, etc.) includes functional circuitry to read, decode and provide signals to allow playback (e.g., through a display, TV or the like) of multimedia content. Accordingly, the CE devices include functional circuitry 314 providing the functional capabilities of the CE devices.

In some embodiments, the power storage circuitry 328 is configured to allow the CE device to store and/or use electrical power. Accordingly, the power storage circuitry can comprise one or more batteries, capacitors, or other such devices configured to store electrical power, or combinations thereof. For simplicity, the power storage circuitry is referred to below as a battery; however, it will be appreciated by those skilled in the art that the power storage is not limited to a battery or single battery. In some embodiments, the wireless power distribution circuitry 316 is coupled with the battery 328 (e.g., through direct coupling, a bus, or other such coupling), and configured to implement wireless power transfer between the first CE device 112 and one or more other CE devices (e.g., the second CE device 114).

The controller 312, in some implementations, couples with the wireless power distribution circuitry 316 and provides at least some control over the activation and/or deactivation of the wireless transfer of power. The controller can be implemented through one or more processors, microprocessors, logic, memory and the like. Further, the controller 312 may be a specific controller for controlling the antenna system 210, the wireless power transfer, wireless communication, and/or may have additional functionality, such as providing control over some or all of the functionality of first CE device 112 (e.g., wireless communication, multimedia processing, decoding, encoding, etc.). In some implementations, the controller 312 is configured to at least in part control the wireless transfer of power through the power transfer antenna, and/or to selectively direct communications to and receive communications through at least one of the one or more communications antennas. Further, in some embodiments, controller 312 can selectively direct different communications to different ones of the multiple communications antennas based on a communication protocol with which the communications are to be wirelessly transmitted.

The wireless power distribution circuitry 316 is further coupled with the power transfer antenna 212, and is configured to wirelessly receive and/or transfer power through the power transfer antenna from and/or to the second CE device 114. The power can be retrieved from the battery 328 or other power source (e.g., external wall socket, computer through USB, car connector, etc.), and/or to store at least some of the power in the battery.

In some embodiments, the power transfer antenna 212 is configured to inductively couple with one or more other power transfer antennas or other such devices that are configured of wirelessly receive and/or transmit electrical power from or to the first CE device 112 through the power transfer antenna 212. In some embodiments, the power transfer antenna 212 is part of the wireless power distribution circuitry 316, while in other embodiments it is cooperated with the power distribution circuitry. The power transfer antenna can be formed from one or more coils (e.g., one or more planar coils, helical coils, etc.), circular disc configurations, serpentine configures or other such configurations or combinations of such configurations. Further, the power transfer antenna is shown within the antenna system 210 and the first CE device 112; however, the power transfer antenna may partially extend out of a housing or be fully outside the housing of the antenna system and/or the CE device.

The second CE device 114 typically also includes an antenna system 210, controller 312, and functional circuitry 314. In some embodiments, the second CE device 114 further includes a user interface 322 and one or more batteries 328.

The wireless energy transmission can be carried out through direct induction, resonant magnetic induction or other such techniques or combinations of such techniques. In some implementations, the wireless power transfer is implemented through inductive coupling between the power transfer antenna 212 of the first CE device 112 and the power transfer antenna of the second CE device 114. The inductive electrical power transfer is typically over short distances, such as less than 6 inches, and typically less than 3 inches. Other wireless power transfers, in accordance with some embodiments, may implement a directionally focused transfer that can allow power transfer over larger distances. The power transfer can be implemented through substantially any wireless power transfer techniques and/or standards, such as but not limited to Qi standard, Alliance for Wireless Power (A4WP) standard, Power Matters Alliance (PMA) standard, which are incorporated by reference, and/or other such methods.

Under the Qi specification, low power for inductive transfer typically provides a draw of about 0 to 5 Watts, and typically uses inductive coupling between power transfer antennas or other such devices. For example, in some embodiments the power transfer antenna comprises two planar coils to allow the transfer of power between the power transmitting CE device to the power receiving CE device. The distance between the power transfer antennas is typically less than 15 cm. For example, in some implementations the distance is less than 40 mm, while in many embodiments, the distance is less than about 5 mm.

The wireless power distribution circuitry 316 and/or the controller 312 regulate the output and/or input voltage and/or current, as well as the reception and/or distribution of power. In some embodiments, CE devices utilize a control loop through communications between the CE devices using one of the communications antennas 214 of the antenna system 210 in controller the amount of power transferred and/or rate at which power is transferred. Additionally or alternatively, the wireless power distribution circuitry 316 includes one or more digital control loops where a power receiver communicates with the power transmitter and requests more or less power. In some implementations, the communication may be unidirectional (e.g., from the power receiving portable CE device to the power transmitting portable CE device), but typically is bidirectional.

As introduced above, in some embodiments, the antenna system 210 may include only a single communications antenna, while in other implementations the antenna system includes multiple communications antennas. Accordingly, the communications between CE devices may be over a predefined communication protocol using the single communications antenna, or may be a selected one communication protocol, from one of a plurality of different communications protocols, that both CE devices are configured to utilize. For example, the communication may be over Wi-Fi, Bluetooth, via wireless USB, wireless Ethernet, power modulation (e.g., backscatter modulation), radio-frequency identification (RFID) communications or other such Near Field Communications (NFC), optical communication, High-Definition Multimedia Interface (HDMI) and/or other such communication methods or combinations of such methods. In backscatter modulation, the wireless power transfer antenna of a power receiving CE device (e.g., one or more coils) is loaded, changing a current draw at the power transmitting portable CE device. These current changes can be detected and monitored at the power transmitting CE device and demodulated into the information to allow communication and allow the CE devices to work together.

In some embodiments, the wireless power distribution circuitry 316 further includes charge circuitry and/or power receiver circuitry, such as but not limited to a power pick-up unit. Further, some embodiments include a power conversion unit. The power transfer antenna wirelessly cooperates with the antenna of the power transferring CE device. For example, the power transfer antenna can be configured to capture the magnetic field. The wireless power distribution circuitry 316 and/or the controller 312 regulate the transferred power to levels that are appropriate for the wireless power distribution circuitry, battery 328 and/or other circuitry configured to receive the power. Further, some embodiments include charge circuitry to provide, at least in part, power conversion and/or accumulation to correspond with voltage and/or current levels relevant to the portable CE device.

Referring back to FIG. 2, in many embodiments the power transfer antenna 212 is significantly larger than the one or more communications antennas 214-217. This is often due to the significantly larger number of windings used to construct the power transfer antenna to allow sufficient inductive coupling to allow for sufficient power transfer. Further, in many embodiments, the communications antennas 214-217 are configured to provide low power, short range communications. Accordingly, these antennas are, in many embodiments, implemented through relatively small antennas (e.g., antennas with relatively few windings). It is noted that although the embodiments depicted show the power transfer antenna 212 and the communications antennas 214-217 in circular configurations, other configurations, sizes and/or shapes may be employed, and the communications antennas may have different configurations, sized and/or shapes than the power transfer antenna and/or other communications antennas.

In providing the wireless power transfer, the power transfer antenna 212 is positioned relatively close to a separate power transfer antenna of another CE device. For example, the distance between the power transfer antennas is typically less than 15 cm, and often less than 40 mm. Further, optimum power transfer is often achieved when the two power transfer antennas are aligned. Similarly, wireless communications from one or more of the communications antennas 214-217 are often optimized when aligned with one or more communications antennas of another CE device.

Figure 4A:
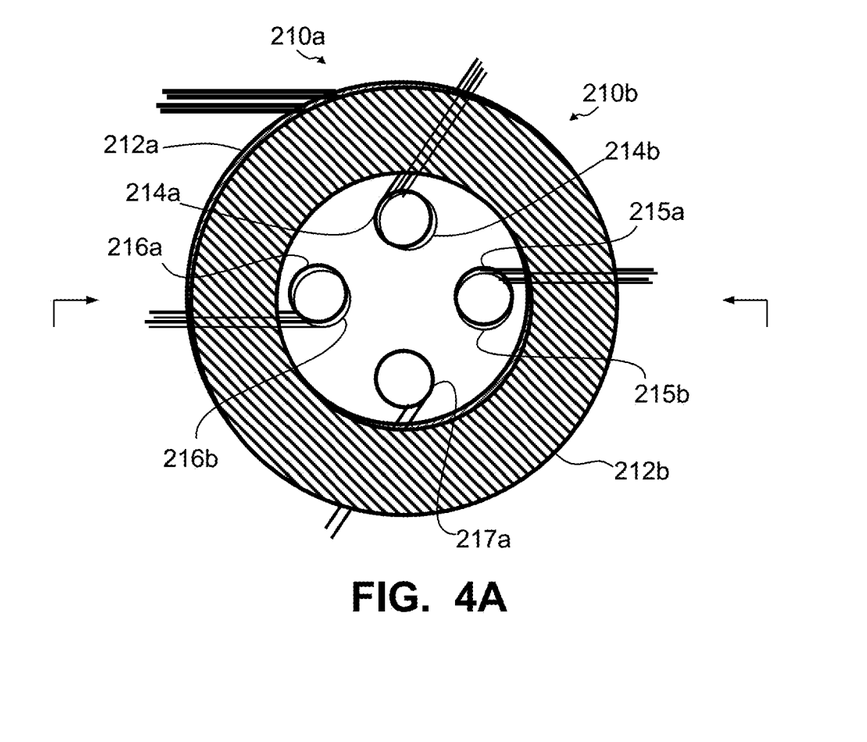
FIG. 4A shows an overhead, plane view of two antenna systems positioned proximate each other, in accordance with some embodiments.
Figure 4B:
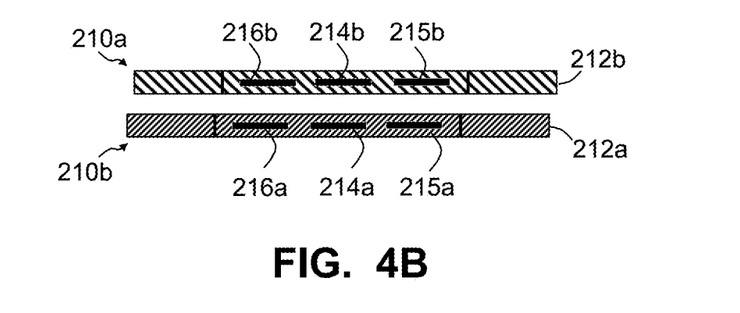
FIG. 4B shows a cross-sectional view of the two antenna systems of FIG. 4A.

FIG. 4A shows an overhead, plane view of two antenna systems 210a, 210b positioned proximate each other, in accordance with some embodiments. FIG. 4B shows a cross-sectional view of the two antenna systems 210a, 210b of FIG. 4A. The two antenna systems 210a, 210b are positions so that at least the power transfer antennas can establish an inductive coupling to allow the power transfer to occur. Further, when more than one communications antenna is included the CE devices can be arranged relative to each other so that the communications antennas 214a-216a of the first CE device also align with one or more communications antennas 214b-216b of the second CE device. The relative proximity can reduce interference and allow lower power usage when communicating through the communications antennas.

In some embodiments, a user interface may be displayed that provides information relevant to aligning the power transfer antennas 212 and/or one or more communications antennas. For example, an software application (APP) on the CE device may be activated that directs the user in movements of the CE device (e.g., up, down, left, right, rotate left, rotate right, etc.) to improve alignment. The APP may initiate a sequence to detect different antennas of a separate CE device, and then to align relevant antennas. For example, first CE device upon activation of power and/or communication coupling can induce one or more pulses from an antenna, and sequentially induce one or more pulses from each of the other antennas. A second CE device can detect the pulses, which also may conform to a predefined protocol (e.g., a communication protocol), include a header that identifies a communication protocol associated with antenna, etc. Further, the APP may allow a user to select a communications antenna and/or communication protocol, and the APP can provide information to the user to more effectively align the relevant one or more antennas with the other one or more antennas of the separate CE device. Other methods of aligning the antennas may additionally or alternatively be utilized. For example, in some embodiments the casing of the CE device may include information on the housing to direct the user in orienting the CE device (e.g., painted marks).

Additionally or alternatively, the CE device may include one or more alignment components that can physically cooperate with corresponding alignment structures of a second CE device, in accordance with some embodiments. The alignment components can be substantially any structure such as but not limited to protrusions, recesses, magnetic features (whether internal or external to a housing), clips or other such structures or a combination of such structures. In some embodiments, the one or more alignment components allow the distance between power transfer antennas of at least two CE devices to be minimized and thus increasing the power transmission efficiency. Similarly, the alignment components can provide a desired orientation of two or more antennas and/or antenna systems to enhance communication and/or power transmission efficiency. For example, a vehicle (car, plane, train, boat, etc.) may include a clip or the like that maintains a position of the CE device while also aligning one or more antennas of an antenna array of the antenna systems in the CE device and the vehicle.

Accordingly, in some embodiments, the antenna system 210 and/or the CE device 112 with which the antenna system is cooperated is configured to include at least one alignment component that facilitates alignment of the antenna system within the consumer electronic device with an antenna system of the separate consumer electronic device. Again, the alignment component can be a physical structure of a case of the CE device, a shape of the CE device, one or more magnetics, clamps, notches, grooves, an APP and/or other such components and/or functionality. In some embodiments, the one or more alignment components can be further configured to maintain a position of the consumer electronic device with the separate consumer electronic device with which power and/or low power, short range communications are occurring or are attempting to be established.

Further, in some implementations, the one or more communications antennas 214-217 are positioned proximate the power transfer antennas 212. For example, the antenna system can include the power transfer antenna constructed with an interior portion or hollow region, and one or more of the communications antennas can be positioned within the interior hollow region. In other implementations, the antennas can be positioned in other orientations and/or positions relative to each other and/or the power transfer antenna 212.

Figure 5:
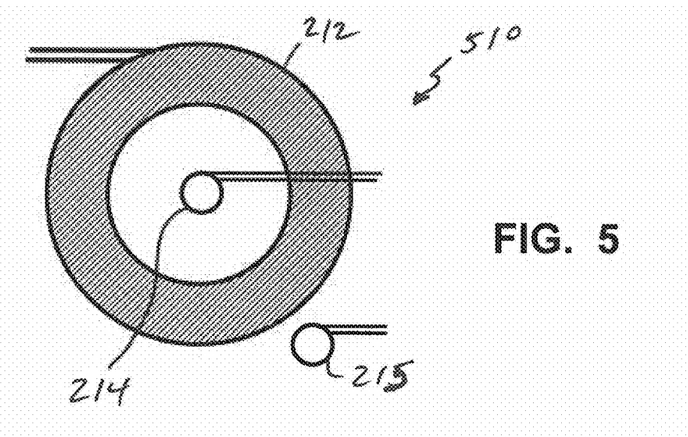
FIG. 5 shows a simplified plane view of an antenna system in accordance with some embodiments.

FIG. 5 shows a simplified plane view of an antenna system 510 in accordance with some embodiments. The antenna system 510 includes one or more power transfer antennas 212 and a plurality of communications antennas 214-215. A first communications antenna 214 is positioned concentric with and/or aligned with a central axis of the power transfer antenna 212. A second communications antenna 215 is positioned exterior to the power transfer antenna. The distance separating the power transfer antenna and the first and/or second communications antennas can depend on many factors, such as but not limited to the size of the antenna system 510, the anticipated power levels in the power transfers, the intended distance limits on wireless communication and/or power transfer, interference, whether shielding is incorporated and/or other such factors, and typically combinations of such factors.

Figure 6:
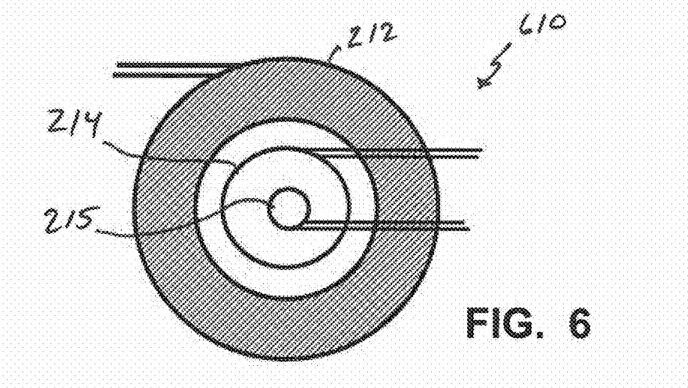
FIG. 6 shows a simplified plane view of an antenna system in accordance with some embodiments.

Again, many different antenna orientations, placement and configurations can be employed. FIG. 6 shows a simplified plane view of an antenna system 610 in accordance with some embodiments. The antenna system 610 includes a power transfer antenna 212 with a first communications antenna 214 and a second communications antenna 215 positioned concentric with and/or aligned with a central axis of the power transfer antenna 212.

Figure 7:
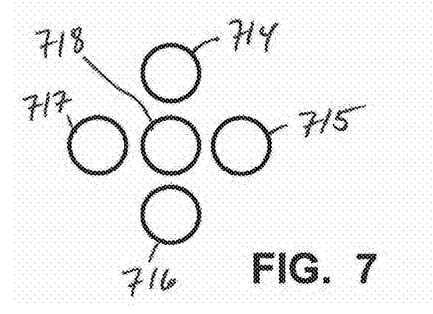
FIG. 7 shows five communications antennas positioned generally in a cross-orientation, in accordance with some embodiments.
Figure 8:
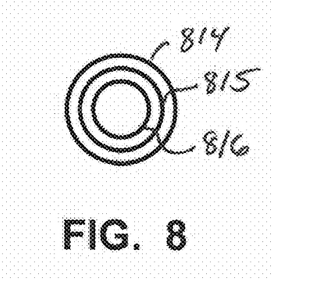
FIG. 8 shows three communications antennas concentrically aligned, in accordance with some embodiments.

Still other orientations of the antennas can be employed. FIG. 7 shows five communications antennas 714-718 positioned generally in a cross-orientation, in accordance with some embodiments. FIG. 8 shows three communications antennas 814-816 concentrically aligned, in accordance with some embodiments. Again, these communication antennas may be concentric with the power transfer antenna, positioned exterior to a power transfer antenna or other orientation relative to the power transfer antenna.

In other embodiments, the power transfer antenna may additionally be used as a communications antenna. For example, communications can be implemented through power modulation. Additionally or alternatively, in some embodiments, one or more communications antennas may be implemented as part of the power transfer antenna.

Figure 9A:
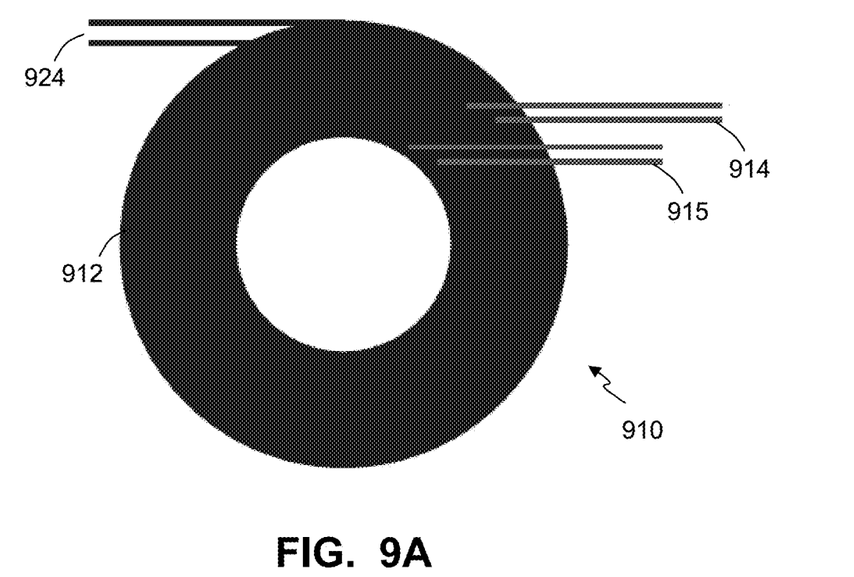
FIG. 9A shows a simplified plane view of at least a portion of an antenna system, in accordance with some embodiments.
Figure 9B:
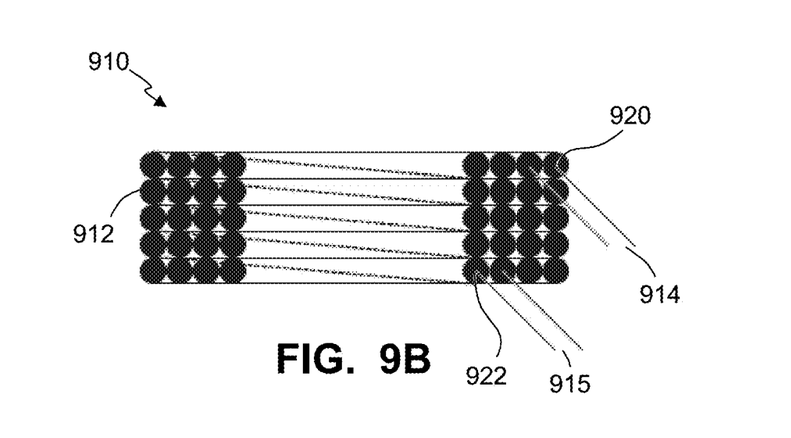
FIG. 9B shows a cross-sectional view of the antenna system of FIG. 9A, in accordance with some embodiments.

FIG. 9A shows a simplified plane view of at least a portion of an antenna system 910, in accordance with some embodiments. FIG. 9B shows a cross-sectional view of the antenna system 910 of FIG. 9A, in accordance with some embodiments. The antenna system includes the power transfer antenna 912 formed from a relatively large number of turns of one or more conductive wiring or other material. Further, multiple communications antennas 914-915 are formed using only portions of the windings of the power transfer antenna 912. For example, a first pair of taps and leads 920 couple across a first set of one or more turns of the wiring forming the first communications antenna 914. A second pair of taps and leads 922 couple across a second set of one or more turns of the wiring forming the second communications antenna 915. Leads 924 further couple with the power transfer antenna to supply relevant power. Again, the different communications antennas can provide wireless communication according to one or multiple different communications protocols. For example, the first communications antenna 914 may be used to wirelessly communicate information in accordance with the USB protocol, while the second communications antenna 915 may be used to wirelessly communicate information in accordance with the Ethernet protocol. Typically, the communications antennas include few windings while the power antenna includes several windings, such as tens or hundreds of turns more than the communications antennas. As such, some embodiments are configured to provide data antennas built-in to the power transfer antenna. Each turn can provide a possible tap that can be a starting or stopping point for a communications antenna.

Again, it is noted that although the embodiments depicted show the power transfer antenna 212 and the communications antennas 214-217 in circular configurations, other configurations, sizes and/or shapes may be employed with the power transfer antenna and/or the communications antennas, and the communications antennas may have different configurations, sized and/or shapes than the power transfer antenna and/or other communications antennas. For example, one or more of the power transfer antenna and communication antennas may be circular disc configurations, serpentine configures, rectangular configurations, plate configurations, and/or other such configurations. Similarly, in some instances, one or more of the power transfer antenna and communication antennas may be implemented as traces on a circuit board.

Further, the antenna system 210 can be configured in different sizes. The size can depend on one or more factors, such as but not limited to an amount of power anticipated to be wirelessly transferred and/or received, number of communications antennas, device into which the antenna system is to be incorporated, complexity of the device into which the antenna system is to be incorporated, or other such factors or combinations of such factors. For example, in some implementations the antenna system is relatively small and/or has a low profile to be incorporated into memory cards, phone SIM cards, credit cards and other such small or low profile devices.

Additionally, as described above, a CE device may include multiple antenna systems 210. This allows a single CE device to receive power from multiple different devices, receive power from a first separate CE device while supplying power to a second separate CE device, and/or simultaneously transfer power to multiple CE devices. Similarly, the CE device may simultaneously communicate with two separate CE devices. Additionally or alternatively, a CE device can be configured to daisy chain communications and/or power between two separate CE devices. For example, a first communications antenna of a CE device can be configured to provide wireless communication with a first separate CE device, and a second communications antenna can be configured to provide wireless communication with a second separate CE device such that communications from the first separate consumer electronic device is serially and/or daisy chain communicated through the second communications antenna to the second separate consumer electronic device. Further, the antenna system can be configured to wirelessly and inductively receive electrical power through the power transfer antenna from the first separate CE device while receiving communications from the first separate CE device or other separate CE device.

Further, as described above, the antenna system 210 can be utilized in many different types of CE devices, including CE devices configured to provide other wireless communication. For example, one or more antenna systems 210 may be incorporated into a smart phone, with the smart phone including one or more other communications antennas to provide longer range cellular, Wi-Fi and/or other such wireless communications. Accordingly, the antenna system 210 can be used in combination with other communication protocols and/or communication systems. Additionally or alternatively, the antenna system 210 can be configured with additional or alternative communications antennas for longer range wireless communications, such as typical Wi-Fi, Bluetooth or the like to provide longer range communications.

Some embodiments, utilize the antenna system to avoid having to include connectors and/or ports in the CE device. This can allow the CE device to be designed in smaller sizes as external connectors often dictate a size of thickness of some CE devices. Similarly, the antenna system can allow CE devices to have significantly different exterior appearances and/or be placed in positions that may be inconvenient for CE devices that are wired to one or more other devices and/or power sources. It is noted, however, that the antenna system can be incorporated in CE devices that have physical connectors. For example, a computer, set-to-box, base station, laptop, and/or other such devices can have physical connectors while also taking advantage of the functionality provided by the antenna system 210, such as allowing one or more other devices to be stacked.

Still further, in some embodiments, the antenna system can be incorporated into each end of a cable. The antenna systems of the cable could be configured in a pass-through mode to allow the connectors to be chained. Similarly, such a cable could be used with stacked CE devices, for example, where someone wanted to locate devices on a short shelf with one or more devices being located beside other devices instead of on top of them and could be connected with such a cable. It is noted, however, that the antenna systems do not have to be positioned one on top of the other. In many implementations, the antenna systems of two CE devices can be arranged in the CE devices to allow the two CE devices to be placed adjacent to each other instead of stacked.

The antenna system, in some embodiments, can be configured to operate external to one or more devices. For example, the antenna system can be implemented through a dongle, cable, stick or other such device. In some embodiments, the antenna system is added to devices that do not have power transfer and/or wireless communication functionality through a dongle, cable or the like. In some implementation, as described above, a chord can be constructed with the antennae system (e.g., the antenna system can be positioned on one end or in between ends) with one or more traditional connectors (e.g., USB, Ethernet, HDMI, lightning, dock connector, and/or other such connectors). In some instances, a first CE device (e.g., a base station) and with which one or more other CE devices are positioned adjacent the first CE device (e.g., stacked on top of the base station) and act as a dongle in that the first CE device includes the antenna system that it connects to traditional connectors (a power cord, one or more HDMI outputs to attach to legacy TV sets, USB, etc.). The one or more antennas 214 in the antenna system (including the external antenna system that operates as a dongle) can be configured in substantially any arrangement and/or orientation. For example, antennas in an antenna array of an antenna system can be positioned at angles relative to each other and/or the housing and do not have to be parallel with each other or with the housing. Additionally or alternatively, angling one or more of the antennas may reduce an amount of interference between antennas in the antenna system and/or between the antennae system and one or more other antennas in a device, such as a separate Wi-Fi or Bluetooth antennae.

Some embodiments include shielding, such as, shielding added behind the antennae system. Such shielding can reduce emissions and/or transmissions, both power and communication, from the antennae system in an undesired direction (e.g., emissions flowing backwards into a transmitting device). Such shielding can also reduce an amount of incoming transmissions that make it past the receiving antennae system. For example, shielding can be beneficial when stacking CE devices that have the antennae system, including CE devices that have more than one antenna system (e.g., on both the top and bottom of the CE device), beneficial with thin devices, and other implementations.

In some embodiments, furniture, counters and the like may include a clip, pad, plate or the like that allows a CE device to be positioned adjacent to and/or on the furniture to allow communications and/or power transfer. For example, a conference room table may include one or more antenna systems (e.g., plates or pads proximate the top surface of the table) that allow users to place their laptops, smart phones, etc. on or adjacent the antenna system pads to provide power to the laptop or the like, and allow the laptop to establish communication with a local network (LAN) and/or gain access to other networks or other communication systems. Further, the pad with the antenna system incorporated into a conference room table may also allow the CE device, such as a laptop, that is placed on the pad to wirelessly communicate information (e.g., video and/or audio signals) to display systems of the conference room to be displayed. Similarly, a conference room phone may be placed on top of an antenna system pad on a conference table providing power to the conference room phone, while also allowing the phone to establish communications through the one or more communications antennas 214-217. This can reduce and/or eliminate the number of cords that have to be strung across a conference room table.

Furthermore, antenna systems can be incorporated into furniture, counters and the like at hospitals, airports, train stations, and other such public and not public places. For example, antennae systems may be beneficial in hospital and/or other public places where a surface positioned over and/or protecting the antennae system can be readily cleaned and/or sanitized (e.g., a surface in a hospital can be a smooth (whether the surface is flat or shaped for alignment) and made from a material that can be easily sanitized). In some embodiments, CE devices that include antenna systems 210 can further be designed such that they are completely sealed, without external connectors, because the antenna systems provide wireless power and communications connections. In addition to being easier to clean, such a device can be made relatively waterproof and submersible. This can be quite useful for wet applications, such as boats, swimming pools or spas, scuba diving, containers of liquids in factories, military applications and other such implementations.

Figure 10:
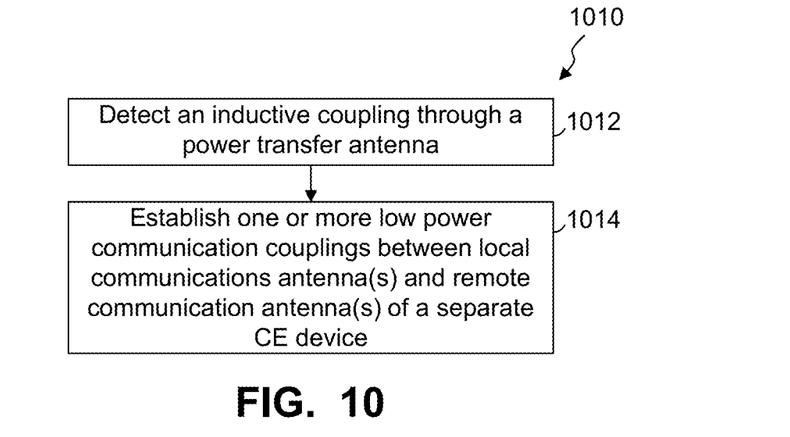
FIG. 10 depicts a simplified flow diagram of a process of providing wireless power transfer and/or wireless communication between CE devices, in accordance with some embodiments.

FIG. 10 depicts a simplified flow diagram of a process 1010 of providing wireless power transfer and/or wireless communication between CE devices, in accordance with some embodiments. In step 1012, an inductive coupling is detected through the power transfer antenna 212 in an antenna system 210 secured with a CE device 112 with a separate power transfer antenna cooperated with a separate CE device. As described above, the power transfer antenna is configured to wirelessly and inductively receive electrical power from another consumer electronic device and to wirelessly and inductively transmit electrical power to another consumer electronic device. In some embodiments, the power transfer antenna is incorporated within a module or system that is readily positioned within and mounted with multiple different types of CE devices. The antenna system provides the CE device within which it is mounted with wireless power transfer capabilities and communication capabilities. For example, in some embodiments the power transfer antenna 212 is typically cooperated with a frame 220.

In step 1014, one or more low power communication couplings are established between one or more local communications antennas, which are cooperated with the frame, and one or more remote other communication antennas of the separate CE device. The one or more communications antennas are configured to wirelessly transmit and receive communications with the one or more other communication antennas. In some embodiments, the distances over which the wireless communications are configured to occur are limited to and/or consistent with those to achieve wireless and inductive electrical power transfer through the power transfer antenna. In some implementations, the CE device may include other communication antennas, systems or the like that allow for other wireless communication, such as but not limited to cellular, Bluetooth or other such longer range communications.

In some embodiments, one or more low power communications antennas, which are cooperated with the frame, are aligned with the one or more remote other communication antennas of the separate CE device. Further, in some embodiments, the establishment of the communication couplings of the one or more local communications antennas includes detecting coupling between the one or more local communications antennas and the one or more other communications channels, and/or displaying recommendations to improve the communication coupling. For example, arrows may be displays to direct movement of the CE device, a target may be displayed, bars indicating strength of coupling may be displayed, or other such recommendations may be provided. Similarly, recommendations may additionally or alternatively be displayed to improve the inductive coupling. Through the inductive coupling, electrical power can be wirelessly transferred through the power transfer antenna to and/or from the separate CE device. Additionally, wireless communication is provided through at least one of the one or more communication antennas with the separate CE device, which in some implementations can be provided while also wirelessly transferring power through the power transfer antenna.

Figure 11:
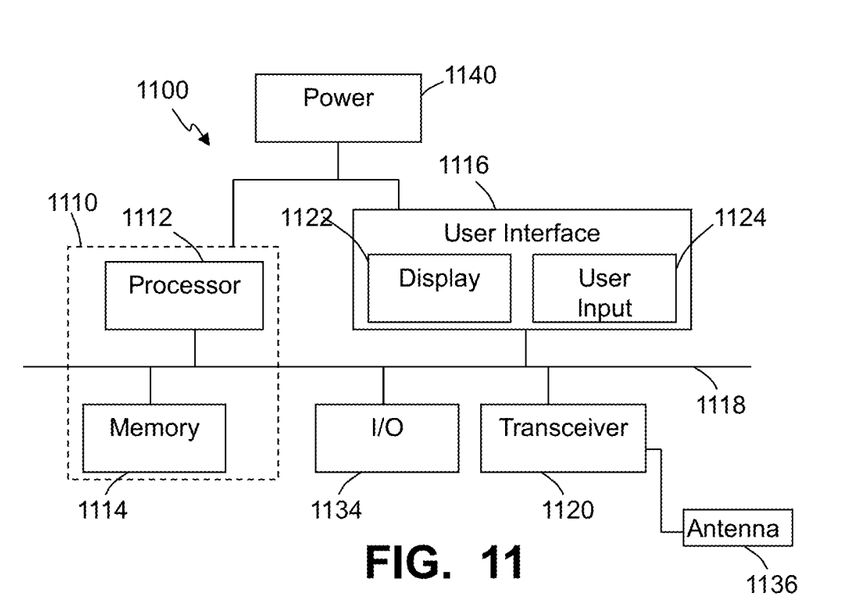
FIG. 11 illustrates a system for use in implementing methods, techniques, devices, apparatuses, systems, servers, sources and the like in providing user interactive virtual environments in accordance with some embodiments.

The systems, methods, techniques, devices and the like described herein may be utilized, implemented and/or run on many different types of devices and/or systems. Referring to FIG. 11, there is illustrated a system and/or circuitry 1100 that may be used for any such implementations, in accordance with some embodiments. One or more components of the system 1100 may be used for implementing any system, apparatus, circuitry or device mentioned above or below, or parts of such systems, apparatuses, circuitry or devices, such as for example any of the above or below mentioned CE devices 112, 114, 130-133, controllers 312, antenna systems 210, CE functional circuitry 314, user interface 322, wireless power distribution circuitry 316 and the like. However, the use of the system 1100 or any portion thereof is certainly not required.

By way of example, the system 1100 may comprise a controller or processor module 1112, memory 1114, a user interface 1116, and one or more communication links, paths, buses or the like 1118. A power source, battery or supply 1140 is included or coupled with the system 1100. The controller 1112 can be implemented through one or more processors, microprocessors, central processing unit, logic, local digital storage, firmware and/or other control hardware and/or software, and may be used to execute or assist in executing the steps of the processes, methods and techniques described herein, and control various communications, programs, content, listings, services, interfaces, etc. Further, in some embodiments, the controller 1112 can be part of a control system 1110 and/or implemented through one or more processors with access to one or more memory 1114. The user interface 1116 can allow a user to interact with the system 1100 and receive information through the system. In some instances, the user interface 1116 includes a display 1122 and/or one or more user inputs 1124, such as a remote control, keyboard, mouse, track ball, game controller, buttons, touch screen, etc., which can be part of or wired or wirelessly coupled with the system 1100.

Typically, the system 1100 further includes one or more communication interfaces, ports, transceivers 1120 and the like allowing the system 1100 to communication over a communication bus, a distributed network, a local network, the Internet, communication link 1118, other networks or communication channels with other devices and/or other such communications or combinations thereof. Further the transceiver 1120 can be configured for wired, wireless, optical, fiber optical cable or other such communication configurations or combinations of such communications. The system 1100 further includes one or more antennae 1136, typically at least a power transfer antenna, and one or more communications antennas. One or more inputs and/or outputs 1134 may be provided, such as power and/or communication ports, audio adaptor ports, etc.

The system 1100 comprises an example of a control and/or processor-based system with the controller 1112. Again, the controller 1112 can be implemented through one or more processors, controllers, central processing units, logic, software and the like. Further, in some implementations the controller 1112 may provide multiprocessor functionality.

The memory 1114, which can be accessed by the controller 1112, typically includes one or more processor readable and/or computer readable media accessed by at least the controller 1112, and can include volatile and/or nonvolatile media, such as RAM, ROM, EEPROM, flash memory and/or other memory technology. Further, the memory 1114 is shown as internal to the system 1110; however, the memory 1114 can be internal, external or a combination of internal and external memory. Similarly, some or all of the memory 1114 can be internal, external or a combination of internal and external memory of the controller 1112. The external memory can be substantially any relevant memory such as, but not limited to, one or more of flash memory secure digital (SD) card, universal serial bus (USB) stick or drive, other memory cards, hard drive and other such memory or combinations of such memory. The memory 1114 can store code, software, executables, scripts, data, content, multimedia content, programming, programs, log or history data, user information and the like.

One or more of the embodiments, methods, processes, approaches, and/or techniques described above or below may be implemented in one or more computer programs executable by a processor-based system. By way of example, such a processor based system may comprise the processor based system 1100, a cellular phone (e.g., a smart phone), a tablet, a laptop, a computer, a set-to-box, an television, an IP enabled television, a Blu-ray player, an IP enabled Blu-ray player, a DVD player, entertainment system, gaming console, graphics workstation, tablet, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques to enable the wireless power transfer between two or more CE devices and wireless communication. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: detecting, through a power transfer antenna in an antenna system secured with a consumer electronic (CE) device, an inductive coupling with a separate power transfer antenna cooperated with a separate CE device, wherein the power transfer antenna is configured to wirelessly and inductively receive electrical power from another consumer electronic device and to wirelessly and inductively transmit electrical power to another consumer electronic device, and wherein the power transfer antenna is cooperated with a frame; establishing one or more low power communication couplings between one or more local low power communications antennas, which are cooperated with the frame, and one or more remote other communication antennas of the separate CE device, wherein the one or more communications antenna are configured to wirelessly transmit and receive communications with the one or more other communication antennas over distances consistent with those to achieve wireless and inductive electrical power transfer through the power transfer antenna; wherein the frame is configured to readily be positioned within and mounted with multiple different CE devices and provide the CD device within which it is mounted with wireless power transfer capabilities and communication capabilities.

While the invention herein disclosed has been described by means of specific embodiments, examples and applications thereof, numerous modifications and variations could be made thereto by those skilled in the art without departing from the scope of the invention set forth in the claims.

What is claimed is:

1. An antenna system configured to operate within a consumer electronic device, wherein the antenna system comprises:

a frame;
a power transfer antenna cooperated with the frame, wherein the power transfer antenna is configured to enable at least one of wirelessly and inductively receiving electrical power from another consumer electronic device and wirelessly and inductively transmitting electrical power to another consumer electronic device, wherein the one or more communications antennas comprise multiple communications antennas positioned proximate the power transfer antenna, wherein each of the multiple communications antennas is utilized in providing communications through a different one of different communication protocols, wherein the different communication protocols comprise Wi Fi protocol and a universal serial bus (USB) communication protocol;
one or more low power communications antennas cooperated with the frame, wherein the one or more communications antenna are configured to wirelessly transmit and receive communications with one or more other remote consumer electronic devices over distances consistent with those to achieve wireless electrical power transfer through the power transfer antenna;
wherein the frame of the antenna system, with the power transfer antenna and the one or more low power communications antennas cooperated with the frame, is configured to readily be positioned within device housings of multiple different types of consumer electronic devices and provide the consumer electronic device within which it is positioned with wireless power transfer capabilities and communication capabilities with a separate consumer electronic device with which wireless power transfer is to occur.

2. The antenna system of claim 1, further comprising:
a controller configured to control the wireless transfer of power through the power transfer antenna, and to selectively direct communications to and receive communications through at least one of the one or more communications antennas.

3. The antenna system of claim 2, wherein the controller selectively directs different communications to different ones of the multiple communications antennas as a function of a respective one of the different communication protocols with which the respective communications of the different communications are intended to be wirelessly transmitted.

4. The antenna system of claim 1, wherein the power transfer antenna is constructed with an interior hollow region and each of the multiple communications antennas are positioned within the interior hollow region.

5. The antenna system of claim 1, wherein at least one of the one or more communications antennas is positioned concentric with the power transfer antenna.

6. The antenna system of claim 1, wherein a first communications antenna of the one or more communications antennas is configured to provide wireless communication with a first separate consumer electronic device;
wherein a second communications antenna of the one or more communications antennas is configured to provide wireless communication with a second separate consumer electronic device, while at the same time the first communications antenna is positioned to provide wireless communication with the first separate consumer electronic device, so that communications from the first separate consumer electronic device received through the first communications antenna is communicated through the second communications antenna to the second separate consumer electronic device.

7. The antenna system of claim 6, wherein the power transfer antenna is configured to wirelessly receive electrical power from the first separate consumer electronic device while receiving the communications from the first separate consumer electronic.

8. The antenna system of claim 1, further comprising multiple transceivers each coupled with at least one of the one or more communications antennas provide bidirectional communication utilizing one or more of the different communication protocols.

9. The antenna system of claim 1, wherein the power transfer antenna is configured to both wirelessly receive electrical power from and to wirelessly transmit electrical power to one or more consumer electronic devices.

10. The antenna system of claim 9, further comprising:
a controller configured to direct communications through a first communications antenna of the one or more communications antennas utilizing a first communications protocol, and to switch to a second communications protocol to direct different communications through the first communications antenna utilizing the second communications protocol.

11. A method, comprising:
detecting, through a power transfer antenna in an antenna system secured with a consumer electronic (CE) device, an inductive coupling with a separate power transfer antenna cooperated with a separate CE device, wherein the power transfer antenna is configured to wirelessly receive electrical power from another consumer electronic device and to wirelessly transmit electrical power to another consumer electronic device, and wherein the power transfer antenna is cooperated with a frame;
establishing one or more low power communication couplings between one or more local low power communications antennas, which are cooperated with the frame, and one or more remote other communication antennas of the separate CE device, wherein the one or more communications antenna are configured to wirelessly transmit and receive communications with the one or more other communication antennas over distances consistent with those to achieve wireless electrical power transfer through the power transfer antenna, wherein the one or more communications antennas comprise multiple communications antennas positioned proximate the power transfer antenna, wherein each of the multiple communications antennas is utilized in providing communications through a different one of different communication protocols, wherein the different communication protocols comprise Wi-Fi protocol and a universal serial bus (USB) communication protocol;
wherein the frame, with the power transfer antenna and the one or more low power communications antennas cooperated with the frame, is configured to readily be positioned within device housings of multiple different types of consumer electronic devices and provides the CE device within which it is positioned with wireless power transfer capabilities and communication capabilities.

12. The method of claim 11, further comprising:
displaying recommendations to improve the inductive coupling.

13. The method of claim 12, further comprising:
displaying recommendations to improve coupling between at least one of the one or more communications antennas with at least one of the one or more other communication antennas.

14. The method of claim 11, further comprising:
wirelessly transferring power from through the power transfer antenna to the separate CE device; and
wirelessly communicating through at least one of the one or more communications antennas with the separate CE device while wirelessly transferring power through the power transfer antenna.

15. The antenna system of claim 1, wherein the frame is sized and shaped in accordance with a predefined standard such that the antenna system is operable within the device housings of any one of the multiple different types of consumer electronic devices that are designed in accordance with the predefined standard such that the frame, with the one or more low power communications antennas and the power transfer antenna cooperated with the frame, is configured to be positioned within any one of the multiple different types of consumer electronic devices.

16. The antenna system of claim 1, further comprising:
a connector exposed external to the frame of the antenna system and coupled with leads of at least one of the power transfer antenna and the one or more communications antennas, wherein the connector is configured to mate with at least one mating connector of the consumer electronic device and establish an electrical connection with at least one component of the consumer electronic device.

17. The antenna system of claim 1, further comprising:
a controller configured to selectively direct communications to and receive communications through at least one of the one or more communications antennas, and further configured to communicate with a separate controller of a separate antenna system within the separate consumer electronic device and select a first communication protocol to be utilized of the multiple different communication protocols, identify a first communication antenna, of the one or more communications antennas, to be utilized in communication with the first communication protocol, cause a switch from a second communication antenna, of the one or more communications antennas, to the first communication antenna, and cause communications via the first communication antenna using the first communication protocol, wherein the first communications antenna and second communications antenna both provide low power wireless communications over limited distances consistent with those to achieve wireless electrical power transfer through the power transfer antenna.

18. The antenna system of claim 17, wherein the controller is configured to cause a sequence of instructions to be displayed on a display of the consumer electronic device directing movement of the consumer electronic device by a user to both detect different antennas of the separate consumer electronic device and to align at least one of the power transfer antenna and the one or more low power communications antennas with at least one of the different antennas of the separate consumer electronic device.

19. The antenna system of claim 4, wherein a first communication wirelessly received from a first separate CE device through a first antenna of the one or more communications antennas is daisy chain communicated wirelessly through a second communication antenna of the one or more communication antennas to a second separate CE device, and wirelessly receive power from the first separate CE device, and wirelessly transfer the power to the second separate CE device.

* * * * *